United States Patent [19]

Schneidmiller

[11] Patent Number: 4,899,485
[45] Date of Patent: Feb. 13, 1990

[54] DISPOSABLE INSECT TRAP WITH FLEXIBLE CONTAINER

[76] Inventor: Rodney G. Schneidmiller, S. 1911 Conklin Rd., Veradale, Wash. 99037

[21] Appl. No.: 148,049

[22] Filed: Jan. 25, 1988

Related U.S. Application Data

[63] Continuation-in-part of Ser. No. 938,454, Dec. 5, 1986, abandoned.

[51] Int. Cl.[4] ............................................. A01M 1/10
[52] U.S. Cl. ......................................... 43/122; 43/107
[58] Field of Search .................. 43/122, 107, 118, 111, 43/112, 113

[56] References Cited

U.S. PATENT DOCUMENTS

| | | | |
|---|---|---|---|
| 1,005,530 | 10/1911 | Fritsch | 43/107 |
| 2,809,465 | 10/1957 | Guinotte | 43/122 |
| 3,020,671 | 2/1962 | Potter | 43/113 |
| 3,152,420 | 10/1964 | Pawl | 43/113 |
| 4,141,173 | 2/1979 | Weimert et al. | 43/113 |
| 4,706,410 | 11/1987 | Briese | 43/122 |

*Primary Examiner*—Nicholas P. Godici
*Assistant Examiner*—Carmine Cuda
*Attorney, Agent, or Firm*—Keith S. Bergman

[57] ABSTRACT

A containment-type trap for flying insects provides a rigid, opaque top element of elongate shape that is carried within an orifice defined in the top of a flat, flexible, partially transparent container bag to support that bag. The top member provides entryways for flying insects and both top and bag provide charactristics to attract flying insects. The bag carries containerized attractant material so that oil, water or both may be added to the assembled device to create a viable trap. Water aids in drowning insects and oil aids in asphyxiating them. The trap is collapsible to a small volume for storage and transport and is inexpensive of manufacture so as to be disposable after a single use.

13 Claims, 1 Drawing Sheet

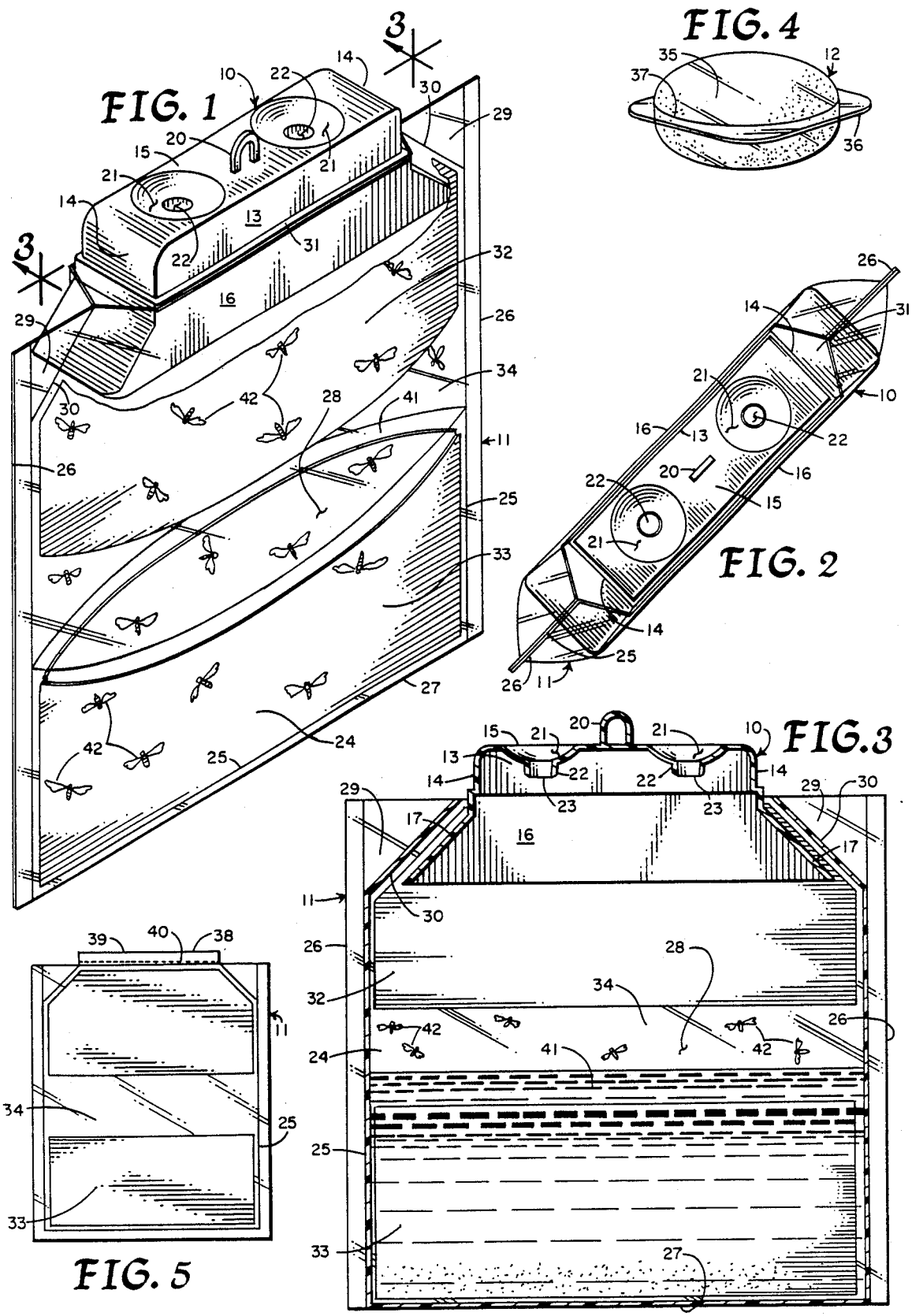

DISPOSABLE INSECT TRAP WITH FLEXIBLE CONTAINER

RELATED APPLICATIONS

This is a continuation in part of application, Ser. No. 938,454, filed Dec. 5, 1986, now abandoned.

BACKGROUND OF THE INVENTION

1. Field of Invention

My invention relates generally to a containment-type trap for flying insects and more particularly to such a trap that is disposable and has a flexible containment chamber.

2. Description of Prior Art

Containment type insect traps have become increasingly popular in the recent past with the advent of both more efficient and effective devices of this nature and various governmental restrictions upon the use of chemical pesticides, which may be deleterious to the environment and human health. Notwithstanding reasonably effective control measures, however, the insect population seems to remain substantially the same and continues to present not only an irritating nuisance for both man and beast, but also a health hazard and economic liability for both. This has been especially true in the more primitive, less developed societal groups emerging as viable entities in various parts of the modern world.

Containment-type insect traps heretofore known have generally been of a rigid construction, which by reason of the nature of the device has tended to cause them to occupy a substantial spatial volume, especially in storage and transport. Such devices as have been effective also, in general, have provided a reasonably complex structure which may require some skill for proper operation, sometimes beyond the abilities of various of the population that need such a device, and if such traps be not properly operated they may lose a substantial amount of their effectiveness. Such known devices also have been relatively expensive and have therefore generally been of a re-usable type which has added somewhat to the difficulty of their use because of the skill and manipulation required for recycling. The relatively high potentiality of loss or destruction of such devices has often made them not economically unfeasible. The use of rigid re-usable traps has also been limited, especially in higher societal groups, by the psychological aesthetics and sometimes biological hazards of users' being unwilling to empty the traps of insect bodies and debris to recycle them for reuse.

The purpose of my invention is to alleviate these problems by providing a relatively inexpensive, disposable, containment-type trap that is designed for single use and serves as a container for disposition thereafter.

To accomplish this purpose my invention provides a rigid top portion with a larger outwardly flaring lower part that fits within an orifice of a flexible plastic bag to support that bag and expand it to create a containment chamber therein. This construction is economical enough to allow a single use, disposable type trap and also provide a structure that occupies a relatively small volume prior to use, but still allows maintenance of various features heretofore known to effectively attract and entrap flying insects and the addition of new features that make the device more effective.

The primary attractant for my trap is an odoriferous substance that may be in the form of a solid or liquid and that may or may not be containerized, as desired. An effective fly attractant is a dry particulate mixture of yeast, egg and milk solids that may be containerized in a water soluble membrane for activation upon addition of water. Chemical attractants, especially for wasps and similar insects, may be provided in an oil type carrier that also serves to provide oily material to aid insect asphyxiation. This latter material may be containerized in a soluble membrane or bag or in a frangible container that may be physically opened by a user such as by tearing, rupturing or the like. Containerization of attractant material aids in maintaining that material in the bag of my trap during operations prior to actual use.

The only procedures necessary to activate my trap are to fill it with an appropriate amount of water, release its attractant if necessary, and hang or otherwise positionally maintain it where desired for insect entrapment. These functions are of such a simple nature that almost any human being with enough intellect to be irritated or damaged by insects is capable of accomplishing them without any particular difficulty.

My trap may be provided with oil to aid in causing an insect's demise by asphyxiation. Oil floats on a water surface to coat an insect's abdomen on contact and thereby disrupt the breathing process, especially as in the case of wasps or yellow jackets which have a semi-rigid abdominal covering which resists water penetration. Such oil is provided with the attractant or separately, as desired. Prior art devices generally have not provided oil for this purpose.

My trap provides particular colorations and images attractive to insects, entryways adapted to conform to insect instincts or so-called "psychology", a greenhouse effect and liquid to aid the demise of insects, and various other amenities heretofore known in containment-type traps to aid the entrapment and demise of flying insects. In addition, the containment bag admirably lends itself to provision of a medial, transparent strip with opaque areas above and below to provide a medial lighted area in the containment chamber, immediately above fluid carried therein. This concentrates an entrapped insect's activities in this area, immediately above the surface of contained liquid, to tend to cause an insect to contact that liquid more readily then if the transparent area were not present in this position. This structure also secondarily serves to provide a defined filling line to indicate the amount of fluid to be introduced into the entrapment container.

A species of my trap provides a totally enclosed containment bag with an orifice defined by a severable strip, removable at time of use, to allow the bag to serve as its own container for merchandising.

My invention resides not in any one of these structures or features, per se, but rather in the synergistic combination of all of them to provide the functions necessarily flowing therefrom, that distinguish it from the prior art.

SUMMARY OF INVENTION

My invention generally provides a rigid, elongate peripherally defined top member, defining entry orifices for insects and a larger outwardly flaring lower skirt portion to support the orifice of a flexible containment bag depending therefrom. The depending containment bag carries attractant material and liquid to form a viable attractant material for the particular insects involved and a means to aid their demise by drowning.

My trap provides other features heretofore known to efficiently and effectively attract insects and cause their demise. The flexible containment bag provides a translucent or transparent portion only for a spaced distance immediately above contained fluid to enhance trap use and action. The particular construction allows the trap to be collapsed into a small volume for transport and storage with liquid being added at the time of use. A species provides all trap elements carried within the containment bag to package the assemblage for merchandising.

In creating such an insect trap, it is:

A principal object of my invention to provide a fluid carrying, containment-type trap for flying insects that has a relatively small, rigid top member and a flexible containment bag suspended therefrom to allow substantial compaction of the device prior to use and especially for transport, storage and merchandising.

A further object of my invention to provide such an insect trap that uses attractant material that may be activated in the containment bag when that bag is partially filled with fluid.

A further object of my invention to provide such an insect trap that embodies constructions and features heretofore known to aid in attracting, entrapping and destroying entrapped insects, and combines them in a fashion compatible with its new features.

A further object of my invention to provide such a trap that has a flexible containment bag, opaque in its upper and lower portions and transparent in a medial portion, so as to indicate a filling level for fluid and create an area of principal light immediately above the surface of contained liquid to concentrate insect activity in that area and cause entrapped insects to more quickly drown.

A further object of my invention to provide a species of flexible bag for such a trap that has a completely closed periphery with a top orifice defined by a severable tab to allow the device to provide containment for trap components.

A still further object of my invention to provide such a trap with insect pictures on its external surface to serve as a visual attractant and a fluid including oil to aid in asphyxiating insects.

A still further object of my invention to provide such a trap that is simple of operation and sufficiently low of cost as to provide an expendable containment-type insect trap for one time use.

A still further object of my invention to provide such a trap that is of new and novel design, of rugged and durable nature, of simple and economic manufacture and one otherwise well suited to the uses and purposes for which it is intended.

Other and further objects of my invention will appear from the following specification and accompanying drawings which form a part hereof. In carrying out the objects of my invention, however, it is to be understood that its essential features are susceptible of change in design and structural arrangement, with only one preferred and practical embodiment being illustrated in the accompanying drawings as is required.

BRIEF DESCRIPTION OF DRAWINGS

In the accompanying drawings which form a part hereof and wherein like numbers of reference refer to similar parts throughout:

FIG. 1 is an isometric surface view of my insect trap showing its various parts, their configuration and relationship.

FIG. 2 is an orthographic top view of the trap of FIG. 1 showing its elements from this aspect.

FIG. 3 is a medial, vertical cross-sectional view of the trap of FIG. 1, taken on the line 3—3 thereon in the direction indicated by the arrows.

FIG. 4 is an enlarged isometric view of a containerized, dry attractant material carried within the containment bag.

FIG. 5 is an orthographic surface view of a species of enclosed containment bag having an orifice defined by a severable tab.

DESCRIPTION OF THE PREFERRED EMBODIMENT

My invention generally provides rigid rectilinear top member 10 having a larger outwardly flaring lower portion supporting depending flexible bag 11. Containerized attractant 12 is carried within the containment bag for activation at use.

Rigid top member 10 provides an upper rectilinear body peripherally defined by similar sides 13, ends 14 and top 15, all structurally communicating at their intersections. The lower portion of the top member defines outwardly flaring similar sides 16 and ends 17 joined at intersecting edges to form a unitary structure of a truncated pyramidal type that flares downwardly to support a depending containment bag. All of these body elements are of a sheet-like nature to peripherally form the top member and define medial chamber 18 therein. One or more internal septum-like cross-supports 19 may be provided for additional strength and rigidity and to maintain appropriate spatial configuration of the top member, especially if it be formed by molding from lighter sheet plastic. Preferably, ends 17 flare outwardly somewhat more than sides 16, as illustrated in FIG. 1. All elements of the lower bag support portion flare outwardly to some degree to provide appropriate interconnection with and support for a depending flexible containment bag.

Top element 15 of the body portion of the top member defines upwardly projecting "U" shaped fastening bracket 20 in a medial position to provide means for fastening the trap to some structure thereabove by suspension. At spaced distance outwardly on each side of fastening bracket 20, top element 15 defines similar entry orifices, each having larger depressed dimples 21 communicating to medial truncated conic entryways 22 depending from the medial portion of the dimples. Dimples 21 are substantially larger in diameter than entryways 22, by a factor of four or there about, and should have a depth about equal to the diameter of the entryways. The entryways themselves each have their smaller base lowermost and should be of a size sufficient to allow the entry of an insect therethrough by crawling, but should be small enough in their lower part as to prevent the exit of an insect therethrough by flying, that is, their smaller diameter should be less than the average distance between the tips of the wings of insects to be trapped. The lower portion of entryways 22 provides sharp edges 23 to prevent, or lessen the probability of, an insect's crawling back through the entryway, as heretofore known in the prior art and disclosed in my prior patents.

Top member 10 is formed of some reasonably rigid and opaque material such as an opacified plastic or resin. If the member be formed from a moldable polymer, it preferably is formed by die molding, according to principles heretofore known. The opacity of the element is required to cause entering insects to move downwardly into the entrapment chamber toward the lighter portion thereof, as heretofore known and disclosed in the existing art. The top member should have a color, at least on its outer surface, that is attractive to insects to be trapped. The preferred color for most insects, and especially flies and wasps, is a yellow-green in the 5300 Angstrom range which in Munsell color definition would be approximately a 5.0 YG 6/10 color ranging toward a 5 Y color, though most colors ranging from a chartreuse yellow-green to a medium cadmium yellow are attractive to many insects as heretofore known.

The size and configuration of the top member are not particularly critical to my invention so long as the essence aforesaid is fulfilled, though I prefer the configuration illustrated, which is at approximately half scale. The only critical dimension in absolute terms is the internal diameter of entryways 22, as indicated, though it does seem a little more difficult to entrap insects in a trap having smaller dimples than in one having larger dimples.

Containment bag 11 provides a rectilinear structure formed by two similar, flexible, sheet-like sides 24 joined by peripheral seam 25, immediately inwardly adjacent side edges 26 and bottom 27, to define internal chamber 28 for the containment of liquid. Lateral top portions 29 of the bag are joined along inwardly and upwardly angling seams 30 to define medial top orifice 31 having a length slightly greater then the longer dimension, parallel to body sides 13, of top member 10. With this structure containment bag 11 may have top member 10 inserted therein, and moved to the position shown in FIG. 1, with the upper rectilinear body of the top member projecting through top orifice 31 defined in the bag, to support the bag on the lower flared portion of the top member, as illustrated.

Upper portion 32 and lower portion 33 of each side of the bag are rendered opaque to light, or at least substantially so, by overprinting, silk screening or the like with opaque material to leave medial transparent or translucent band 34. The top of lower opaque portion 33 is preferably so positioned that it constitutes a marker for filling the containment bag with liquid so that the liquid level is substantially at that point in the bag when the bag is used.

The containment bag is formed from a transparent, flexible, sheet-like material, preferably of a polymeric nature. The material of its formation must be such as not to have any substantial deformation by way of stretching when in use, as if that material should be stretched to any substantial degree it might not be properly supported on and by the top member. I have found a multi-layered plastic material such as two sheets of polyester polymer covering each side of a sheet of polyethelene to be quite ideal for the purposes of my invention, though undoubtedly other similar materials known in the prior art might also serve this purpose. If this latter material be used, the polyester sheets should have the direction of greater strength of one sheet perpendicular to that of the other sheet. The material must be of appropriate strength to support itself and fluid contained in a bag formed thereby and must prevent any tearing, especially along edges or joints, during use periods of substantial length. Commonly with ordinary thermal plastics, the peripheral edges of the bag will be joined by thermal sealing or welding, though adhesion or other methods known in the prior art for joining and fastening plastics to form a water tight seam may be used.

Pictures of insects, and particularly of the insect species to be entrapped, may be imprinted on the exterior surface of the containment bag. It has been found that such pictures tend to be a substantial optical attractant especially to arouse the curiosity of nearby insects and to cause them to come within the immediate vicinity of the trap where they are otherwise attracted. The phenomenon apparently is caused either by an insect's social instinct or more probably by his seeking for food in the vicinity of his brethren. It has been found that the effectiveness of such images varies rather directly with their accuracy of representation of the insect involved.

The top portion of containment bag 11 may be adhered or otherwise fastened to the lower flaring portion of top member 10, if desired, but commonly structural attachment is not necessary, and normally not desirable, as the two structures will form a reasonably tight joinder through which insects cannot pass, because of the physical nature of materials of which they are formed and their configuration, as illustrated particularly in FIG. 1. The assembled trap structure may normally be more compactable and more easily dealt with if the top member is free to move relative the containment bag, but this is a matter of convenience and not necessity.

Attractant member 12, in the instance illustrated, provides dry material 35 contained in membranous plastic covering 36, commonly formed with two hemispherical halves joined at medial peripheral seam 37. This seam 37 may be formed by heat sealing in the case of a thermal plastic or otherwise by known joining means, such as adhesion or the like.

The particular attractant material used in my trap may vary with the species of insect to be trapped according to principles heretofore known. Whatever the attractant, however, it preferably is encapsulated and in a form that may be activated with the addition of liquid.

The preferred attractant material for flies comprises a mixture of dried yeast, egg and milk solids which when mixed with water may become an actively fermenting liquid mixture, the odors of which are especially attractive to flies but yet safe, convenient and inexpensive of use. This material, as heretofore known in the prior art, comprises mixtures generally within the following component ranges, by weight:

| | |
|---|---|
| Yeast | ½ to 5 percent |
| Egg solids | 2 to 20 percent |
| Milk solids | 1 to 20 percent |
| Water | 80 to 4 percent |

This material, when prepared in admixed dry form, is substantially unreactive and will maintain its condition and potential activity for an almost indefinite period until it is activated by the addition of water.

The material to attract wasps and yellow jackets is generally a meat extract, its chemical components, or similar chemical substances. Sexual attractant substances specific to any insect generally may also be used as a quite effective attractant. Various mixtures of these compositions are also generally effective, especially for multiple species of insects, and other known attractants may also generally be used with my invention.

These latter attractant compounds are generally not reactive with oil and well carried by it, so the attractants well may be intermixed with oil to serve the double purpose of providing an attractant carrier and also providing oil in the trap to aid insect asphyxiation. This attractant, with or without oil, may also be encapsulated for greater convenience of handling.

The encapsulation material for the attractants is such as to contain the attractant material and keep it in a coherent mass, but yet must readily release that material for activation as an attractant in my trap. This encapsulation may be accomplished readily with a water soluble plastic material or by some sort of a frangible capsule. Either type of encapsulation allows ready and simple release of attractant material for activation of my trap. Many of the presently known water soluble plastic films will serve this purpose, such as polyvinyl alcohols; polynitriles, especially as grafted onto a starch substra; acrylonitriles; and the like. Frangible capsules normally depend more on their construction than their materials of formation for operation, and most of the types heretofore known and used are operative with my invention. If plastic material is used and be thermally reactive, the encapsulation normally will be accomplished with two halves and a seam between them created by thermal means as shown in FIG. 4, though other of the various known encapsulation materials, methods and processes fulfilling the requirements specified may be used.

A species of my invention providing a completely enclosed containment bag is illustrated in FIG. 5. Here tab portion 38 is provided on each side 24, projecting outwardly from the medial top portion of each side. These tab portions are fastened together about their peripheries by seam 39 at a spaced distance outwardly from weakened portion 40 which allows the tab portions to be easily severed from the bag sides to form the top orifice when desired for use. Weakened portion 40 may be defined by perforations or other similar means heretofore known to allow polymeric sheet material to be easily severed at a predetermined position. This species of my invention allows all of the trap's components to be carried and completely enclosed within a containment bag, so that that bag may admirably serve as a container for storage and merchandising of the device to ultimate users.

Having thusly described the structure of my insect trap, its operation and use may be understood.

Firstly, an insect trap is constructed according to the foregoing specification with its three separate members, the rigid top member, the flexible containment bag and the attractant, and the three members are assembled as described and as illustrated in FIG. 1. The encapsulated attractant material is inserted within chamber 28 defined by containment bag 11 through top orifice 31 defined therein. Rigid top member 10 is inserted, so that its lower flared portion will be within and below orifice 31 defined in the containment bag, by inserting the top member endwise through that orifice and then manually manipulating it to a horizontal position, as shown, with the upper rectilinear body projecting outwardly through the orifice and the flared portion resting below that orifice to support the bag and contents against gravity displacement, as illustrated. The containment bag normally will be merchandised and delivered to an ultimate user in this assembled condition, though it might be assembled from the several parts by an instructed ultimate user, if desired.

The species of bag illustrated in FIG. 5 is normally assembled before sealing, with the rigid top member and encased attractant within the containment bag. To use this device, tab 38 is torn from the bag to create a top orifice and the other elements are assembled in the same fashion as previously described.

The thusly assembled trap is then partially filled with liquid through entryways 22.

A predetermined amount of water is added to the bag to provide a fluidic medium for activation of the attractant material, if required, and to serve as a fluidic body to aid the demise of entrapped insects by providing means for their drowning. Normally, this predetermined volume of fluid will be such as to fill the lower portion of the bag to the top of lower opaque part 33 which provides a ready means for measurement of the amount of fluid to be added. When fluid is added to the containment bag, plastic covering 36 of attractant material 35 will dissolve or if a frangible capsule is used it is opened, to release the attractant material and, with an appropriate environment then existent, that material will form a fluidic mixture, activate, and commence its operation within a short period of time.

At least a part of the fluidic medium may comprise an oil. This is advantageous in aiding the demise of various insects and especially wasps and yellow jackets as they have a covering on their abdomen which tends to repel water and prevent their drowning. Oil penetrates this covering and disrupts the insect's breathing process in the abdominal area. The oil will also form a layer on an aqueous medium because of its lower density and this may also lengthen the life of various attractant materials and possibly even accentuate their activity. The oil may be placed in the containment bag prior to merchandising or at the time of use by an ultimate user, if desired.

With the trap thusly filled with fluid, it is placed in a position where it is to entrap insects, normally by suspending it from a cord or other fastening element (not shown) attached between "U" shaped fastening bracket 20 and some external support thereabove (not shown). The area in which the trap is placed should have a reasonable amount of ambient light and for most efficient operation, preferably is in the direct light of the sun during at least some part of a day. By reason of the structure of my trap, it is not practical to support it from the bottom, if in fact possible, though it might be supported from some sort of a rigid standard or base, if desired, rather than from an independent overhead structure.

Once the trap is established as aforesaid, its function and operation are automatic. Insects at a distance from the trap are attracted to or toward it by reason of its coloration and insect images on it, as in general the visual aspects of the trap are the first to come to the attention of an insect and may come to its attention at a greater distance then other aspects. As an insect approaches the trap, the odoriferous attractant caused by the air-born products of the attractant material will pass upwardly in the containment bag and outwardly to the ambient atmosphere through entryways 22. The odoriferous material will generally tend to accumulate most strongly in the entryway dimples and spread in a bulbous pattern thereabout, with concentration functionally dependent upon distance from the entryways. An approaching insect will see insect images on the containment bag and may also see other live insects in the containment chamber through medial transparent part 34. If it does, this commonly will serve as an additional attractant, as the congregation of his brethren will tend to indicate to an insect that there is some reason for such congregation and arouse instinctive behavior to investigate further to see if the reason is food or something else that would benefit it.

With these attractants in the vicinity of the trap enticing an insect's presence, the insect will ultimately sense the olfactory attractant and tend to move toward the point of highest concentration. As it does so, it ultimately will move through entryways 21, and since the concentration of odoriferous material is stronger in the entryway and light more intense therebelow, an insect will most probably enter the trap by crawling through an entryway. Once an insect has done so, it will tend to lose its foothold and either fall into the water therebelow or fly to prevent such happening. Normally, a flying insect will tend to move downwardly toward the surface of the liquid in the containment bag, as the lightest area in the structure is immediately above the water contained therein by reason of the transparent portion of the bag at such point. The insect will continue its flight within the containment bag for a period of time, until it becomes exhausted, and at that time, since there is nothing other then substantially smooth vertical surfaces defining the containment chamber, it will fall into the contained liquid and ultimately drown or be asphyxiated. An insect's demise tends to be accentuated, where sunlight and its radiant energy passes into the bag, by reason of the so-called "greenhouse affect" which tends to maintain a relatively high portion of that energy within the bag and thereby raise the temperature therein to hasten an insect's ultimate exhaustion. As insects fall into the liquid in the containment bag, their carcasses accumulate in the liquid attractant to generally further enhance its effect.

When the attractant in a particular trap is exhausted or when a containment bag becomes too full of insect bodies to be useful, the trap may be disposed by removing it from its suspension and physically disposing of the entire unit, as in the case of other garbage. During this disposition process, the trap and its contents will be substantially contained so long as reasonably manipulated or if desired, entryways 22 might be blocked with stoppers, adhesive tape, or the like for trap disposal. If desired, the rigid top member may be reused with another containment bag.

It is to be noted particularly from the foregoing description that my insect trap might be inexpensively formed, used, and operated by unsophisticated users such as to make it readily available for one time use in economically and culturally developing areas with an unsophisticated populace.

It is further to be noted that the trap may be preassembled and serve as its own packaging for disposition of individual units without any required further packaging and that the trap might be compacted into a quite small volume for storage or transport prior to use.

It is still further to be noted that although my trap provides an inexpensive, compactable structure for one time use, it still provides all of the beneficial features heretofore known in the prior art for the entrapment of insects, based on their habitual and instinctive behavior.

The foregoing description of my invention is necessarily of a detailed nature so that a specific embodiment of it might be set forth as required, but it is to be understood that various modifications of detail, re-arrangement and multiplication of parts might be resorted to without departing from its spirit, essence and scope.

Having thusly described my invention, what I desire to protect by Letters Patent, and what I claim is:

1. A containment type trap with a flexible containment bag for trapping flying insects comprising, in combination:
   a rigid top member having a body portion with an outwardly flaring bag supporting portion depending therefrom, said body portion having means to aid its support and defining at least one entryway for insects, said entryway having a dimple communicating to a medial truncated conic entry orifice having its base uppermost and defining a sharp lower edge, and
   a flexible containment bag having a top defining an orifice so that the containment bag may be suspended from and supported by the top member with the body portion of the top member projecting upwardly through the orifice of the bag.

2. The invention of claim 1 further characterized by:
   the containment bag carrying attractant material contained in a capsule having means to release the encapsulated attractant for activation.

3. The invention of claim 2 wherein the means to release the encapsulated attractant comprises a water soluble capsule.

4. The invention of claim 2 wherein the means to release the encapsulated attractant comprises a frangible capsule which may be opened to release its contents by manual manipulation without removing the capsule from the containment bag.

5. The invention of claim 1 further characterized by:
   the flexible containment bag having a sealed tab structure extending outwardly from the top of the bag and means to aid severing the tab structure from the containment bag to open the top orifice therein.

6. The invention of claim 1 further characterized by the outer surface of the containment bag having a plurality of images of insects to serve as an optical attractant for insects.

7. In a containment-type insect trap having a rigid top member with a rectilinear body portion defining at least one insect entryway and a depending outwardly flaring support portion, the invention comprising:
   a flexible containment bag having a top portion defining an orifice so that the body portion of the top member may be inserted through the orifice to support the bag on the flaring support portion of the top member; and
   the flexible containment bag having a sealed tab structure extending outwardly from the bag top and means to aid in severing the tab structure from the containment bag to open the orifice defined in the top portion thereof.

8. The invention of claim 7 wherein the containment bag has relatively light opaque upper and lower portions and a medial portion that is at least translucent to light.

9. The invention of claim 7 further characterized by the outer surface of the containment bag carrying a plurality of pictures of insects of a type sought to be entrapped.

10. The invention of claim 7 further characterized by:
   the insect trap being suspended by its top member for support;
   the containment bag being partially filled with water to a level not above the lower part of the medial transparent portion thereof; and the containment bag being partially filled with oil to form an oil layer over the water in said bag.

11. A containment-type insect trap comprising in combination:

a rigid peripherally defined top member having an upper elongate body portion structurally communicating with a lower outwardly flaring fastening portion, the top of said body portion defining at least two spaced entryways each having entry dimples depending to communicate with truncated conic entryways having their bases uppermost and a diameter in their lower parts large enough to allow an insect to crawl therethrough but small enough to prevent an insect from flying therethrough, said top member being formed of rigid material having a peripheral surface color attractive to insects;

a flexible containment bag having an upper portion defining a medial orifice so that the body portion of the top member may be inserted through the the orifice to support the bag, said containment bag having upper and lower opaque portions, an external surface color attractive to insects and a medial translucent portion that allows passage of light and, an encapsulated attractant carried within the containment bag.

12. The invention of claim 11 further characterized by:

the flexible containment bag having a tab structure sealed at its external edges and extending outwardly from the upper portion of the containment bag, with a portion of said tab structure having means to aid tearing of the tab structure from the containment bag to open the medial orifice defined in the upper portion thereof.

13. The invention of claim 11 further characterized by:

the insect trap being suspended by its top member from an overhead structure, the containment bag being partially filled with water to a level not above the lower part of the medial transparent portion thereof, and oil being carried within the containment bag to form a layer over said water.

* * * * *